(12) United States Patent
Sakai

(10) Patent No.: US 10,286,864 B2
(45) Date of Patent: May 14, 2019

(54) FRAME STRUCTURE FOR VEHICLE

(71) Applicant: Hino Motors, Ltd., Hino-shi (JP)

(72) Inventor: Riu Sakai, Hino (JP)

(73) Assignee: Hino Motors, Ltd., Hino-shi (JP)

( * ) Notice: Subject to any disclaimer, the term of this patent is extended or adjusted under 35 U.S.C. 154(b) by 0 days.

(21) Appl. No.: 15/735,439

(22) PCT Filed: Jun. 2, 2016

(86) PCT No.: PCT/JP2016/066496
§ 371 (c)(1),
(2) Date: Dec. 11, 2017

(87) PCT Pub. No.: WO2016/203982
PCT Pub. Date: Dec. 22, 2016

(65) Prior Publication Data
US 2018/0244223 A1   Aug. 30, 2018

(30) Foreign Application Priority Data

Jun. 16, 2015 (JP) .................. 2015-120922

(51) Int. Cl.
*B60R 19/24* (2006.01)
*B62D 21/02* (2006.01)
(Continued)

(52) U.S. Cl.
CPC ............ *B60R 19/24* (2013.01); *B60R 19/023* (2013.01); *B62D 21/02* (2013.01); *B60R 2019/247* (2013.01); *B62D 27/065* (2013.01)

(58) Field of Classification Search
CPC ....... B60R 19/24; B60R 21/02; B60R 19/023; B62D 21/02; B62D 27/065
(Continued)

(56) References Cited

U.S. PATENT DOCUMENTS 6,299,210 B1 * 10/2001 Ruehl .................... B62D 21/02
                                                              280/785
7,533,913 B2 * 5/2009 Bae ......................... B60R 19/34
                                                              293/132
(Continued)

FOREIGN PATENT DOCUMENTS

CN        201321080 Y      10/2009
CN        201941843 U       8/2011
(Continued)

OTHER PUBLICATIONS

International Search Report dated Aug. 30, 2016, in PCT/JP2016/066496 filed Jun. 2, 2016.
(Continued)

*Primary Examiner* — Pinel E Romain
(74) *Attorney, Agent, or Firm* — Oblon, McClelland, Maier & Neustadt, L.L.P.

(57) ABSTRACT

A vehicle frame structure includes: a pair of main side rails extending in a vehicle front-rear direction and facing each other; and an extension side rail connected to a front portion of the main side rail in the vehicle front-rear direction and extending in the vehicle front-rear direction. The main side rail includes a main side rail body having a substantially C-shaped cross-section and the extension side rail includes an extension side rail body having a substantially Z-shaped cross-section. A part of a front end surface of the main side rail body and a part of a rear end surface of the extension side rail body face each other in the vehicle front-rear direction.

4 Claims, 5 Drawing Sheets

(51) Int. Cl.
*B60R 19/02* (2006.01)
*B62D 27/06* (2006.01)

(58) Field of Classification Search
USPC .......................................................... 293/154
See application file for complete search history.

(56) References Cited

U.S. PATENT DOCUMENTS

| 8,764,096 B2* | 7/2014 | Han | B60R 19/18 |
| | | | 296/133 |
| 2011/0018248 A1* | 1/2011 | Cordea | B21D 53/88 |
| | | | 280/781 |

FOREIGN PATENT DOCUMENTS

| CN | 203078599 U | 7/2013 |
| DE | 4240344 A1 | 7/1993 |
| EP | 0 646 515 A1 | 4/1995 |
| EP | 0709279 A1 | 5/1996 |
| JP | 11-192965 A | 7/1999 |
| JP | 2000-255447 A | 9/2000 |
| WO | 2014/125739 A1 | 8/2014 |

OTHER PUBLICATIONS

English translation of the International Preliminary Report on Patentability and Written Opinion dated Dec. 28, 2017 in PCT/JP2016/066496, 5 pages.
Japanese Office Action dated Feb. 5, 2019 for Japanese Patent Application No. P2015-120922.
Chinese Office Action dated Feb. 2, 2019 in Chinese Patent Application No. 201680031937.2.

* cited by examiner

FRAME STRUCTURE FOR VEHICLE

TECHNICAL FIELD

The present invention relates to a vehicle frame structure of a truck or the like.

BACKGROUND ART

For example, Patent Literature 1 discloses a vehicle frame structure including a pair of main side rails which extends in a vehicle front-rear direction and faces each other and an extension side rail which is connected to a front portion of the main side rail in the vehicle front-rear direction and extends in the vehicle front-rear direction. In the vehicle frame structure, the main side rail is formed to have a substantially C-shaped cross-section and the extension side rail is formed to have a substantially Z-shaped cross-section. At a connection position, both side rails overlap so that the extension side rail is located at the outside of the main side rail.

CITATION LIST

Patent Literature

Patent Literature 1: European Unexamined Patent Publication No. 646515

SUMMARY OF INVENTION

Technical Problem

In the vehicle frame structure disclosed in Patent Literature 1, for example, when a vehicle collides with obstacles or the like from a front side so that a backward impact force in the vehicle front-rear direction acts on the extension side rails, fastening parts such as bolts connecting both side rails are broken. As a result, there is concern that the extension side rails may fall off from the main side rails. Therefore, there is room for improvement from the viewpoint of collision safety. In order to prevent that such extension side rails fall off, it is considered to increase the number or strength of the fastening parts. However, in this case, an increase in cost becomes a problem.

An aspect of the invention is to provide a vehicle frame structure capable of ensuring collision safety while suppressing an increase in cost.

Solution to Problem

According to an aspect of the invention, there is provided a vehicle frame structure including: a pair of main side rails extending in a vehicle front-rear direction and facing each other; and an extension side rail connected to a front portion of the main side rail in the vehicle front-rear direction and extending in the vehicle front-rear direction, in which the main side rail includes a main side rail body having a substantially C-shaped cross-section, the extension side rail includes an extension side rail body having a substantially Z-shaped cross-section, and a part of a front end surface of the main side rail body and a part of a rear end surface of the extension side rail body face each other in the vehicle front-rear direction.

In the vehicle frame structure, a part of the front end surface of the main side rail body and a part of the rear end surface of the extension side rail body in the vehicle front-rear direction face each other. For this reason, when a backward impact force in the vehicle front-rear direction is applied to the extension side rail, the rear end surface of the extension side rail body bumps into the front end surface of the main side rail body so that an impact force is directly transmitted from the extension side rail to the main side rail. Accordingly, since the impact force is also received by the main side rail body, a load applied to the fastening part connecting both side rails is reduced. As a result, since it is possible to suppress the breakage of the fastening part, it is possible to suppress that the extension side rail falls off. Further, since a load applied to the fastening part is reduced, it is possible to suppress an increase in the number of the fastening parts or an increase in strength thereof. Thus, according to the vehicle frame structure, it is possible to ensure collision safety while suppressing an increase in cost.

The main side rail body may include a main side rail side plate portion extending in a vehicle up-down direction, a main side rail upper plate portion extending inward in a vehicle width direction from an upper edge of the main side rail side plate portion, and a main side rail lower plate portion extending inward in the vehicle width direction from a lower edge of the main side rail side plate portion, and the extension side rail body may include an extension side rail side plate portion extending in the vehicle up-down direction, an extension side rail upper plate portion extending outward in the vehicle width direction from an upper edge of the extension side rail side plate portion, and an extension side rail lower plate portion extending inward in the vehicle width direction from a lower edge of the extension side rail side plate portion.

The extension side rail may further include an extension side rail overlapping portion extending backward in the vehicle front-rear direction from the extension side rail side plate portion, and the main side rail and the extension side rail may overlap each other so that the extension side rail overlapping portion follows an inner surface of the main side rail side plate portion in the vehicle width direction.

The main side rail may include a main side rail overlapping portion extending forward in the vehicle front-rear direction from the main side rail side plate portion, and the main side rail and the extension side rail may overlap each other so that the main side rail overlapping portion follows an outer surface of the extension side rail side plate portion in the vehicle width direction.

Advantageous Effects of Invention

According to an aspect of the invention, it is possible to provide a vehicle frame structure capable of ensuring collision safety while suppressing an increase in cost.

DESCRIPTION OF EMBODIMENTS

Figure 3:
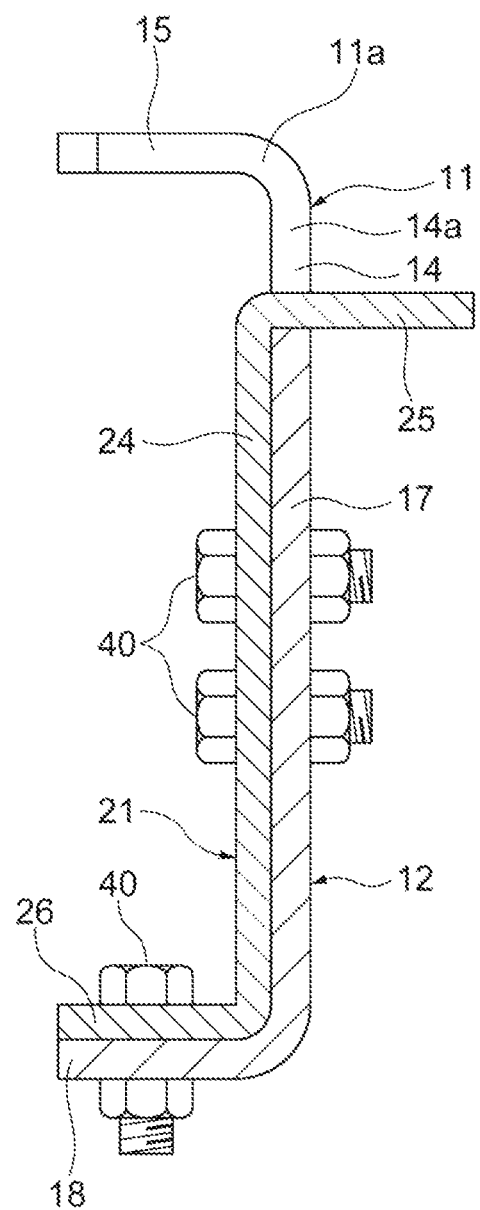
FIG. 3 is a schematic cross-sectional view taken along a line III-III of FIG. 2.
Figure 4:
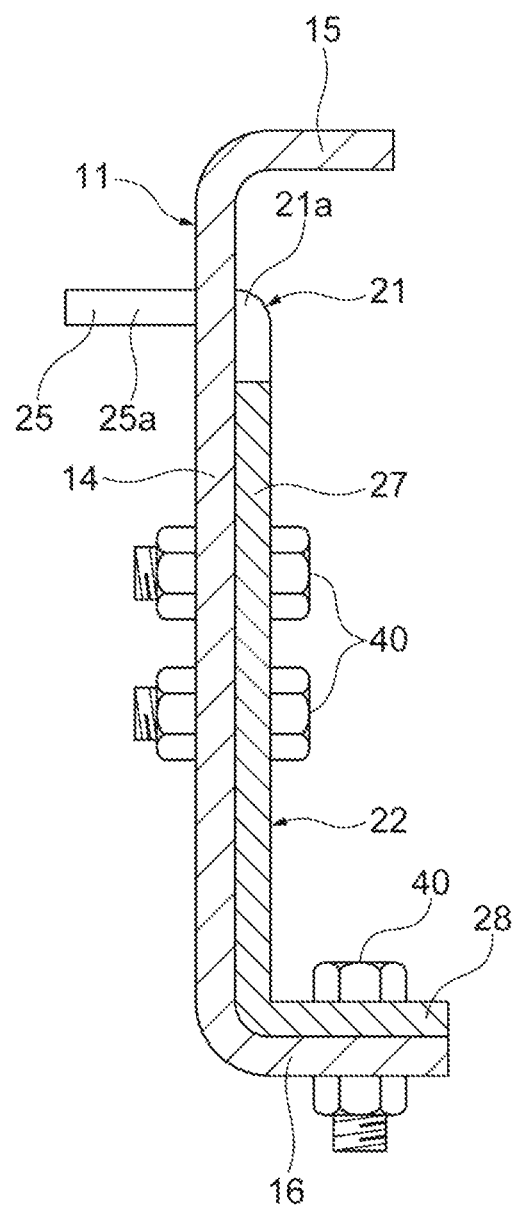
FIG. 4 is a schematic cross-sectional view taken along a line IV-IV of FIG. 2.
Figure 5:
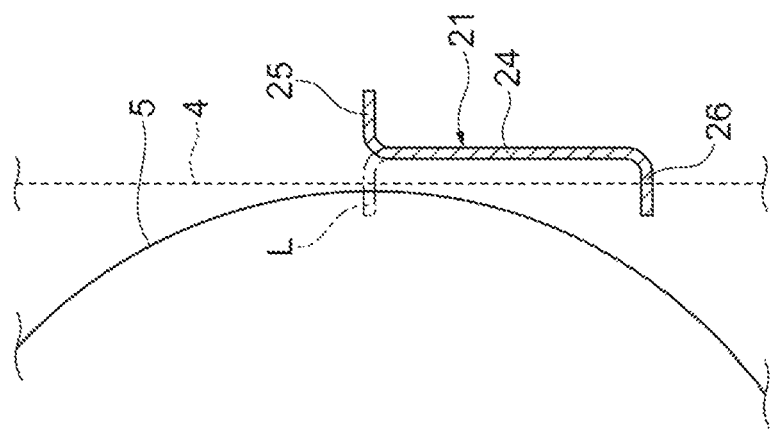
FIG. 5 is a schematic cross-sectional view taken along a line V-V of FIG. 2.
Figure 5:
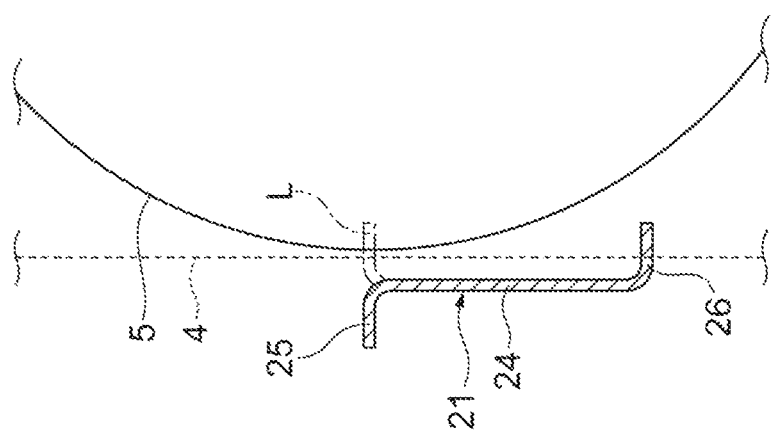

Hereinafter, an embodiment of the invention will be described in detail with reference to the drawings. Additionally, in the following description, the same or equivalent components will be indicated by the same reference numerals, and redundant description will be omitted. In the following description, the up-down direction indicates the up-down direction in the vehicle up-down direction. The front-rear direction indicates the front-rear direction in the vehicle front-rear direction. The inside-outside direction indicates the vehicle inside-outside direction in the vehicle width direction. In FIGS. 3 to 5, a part of the components are omitted.

Figure 1:
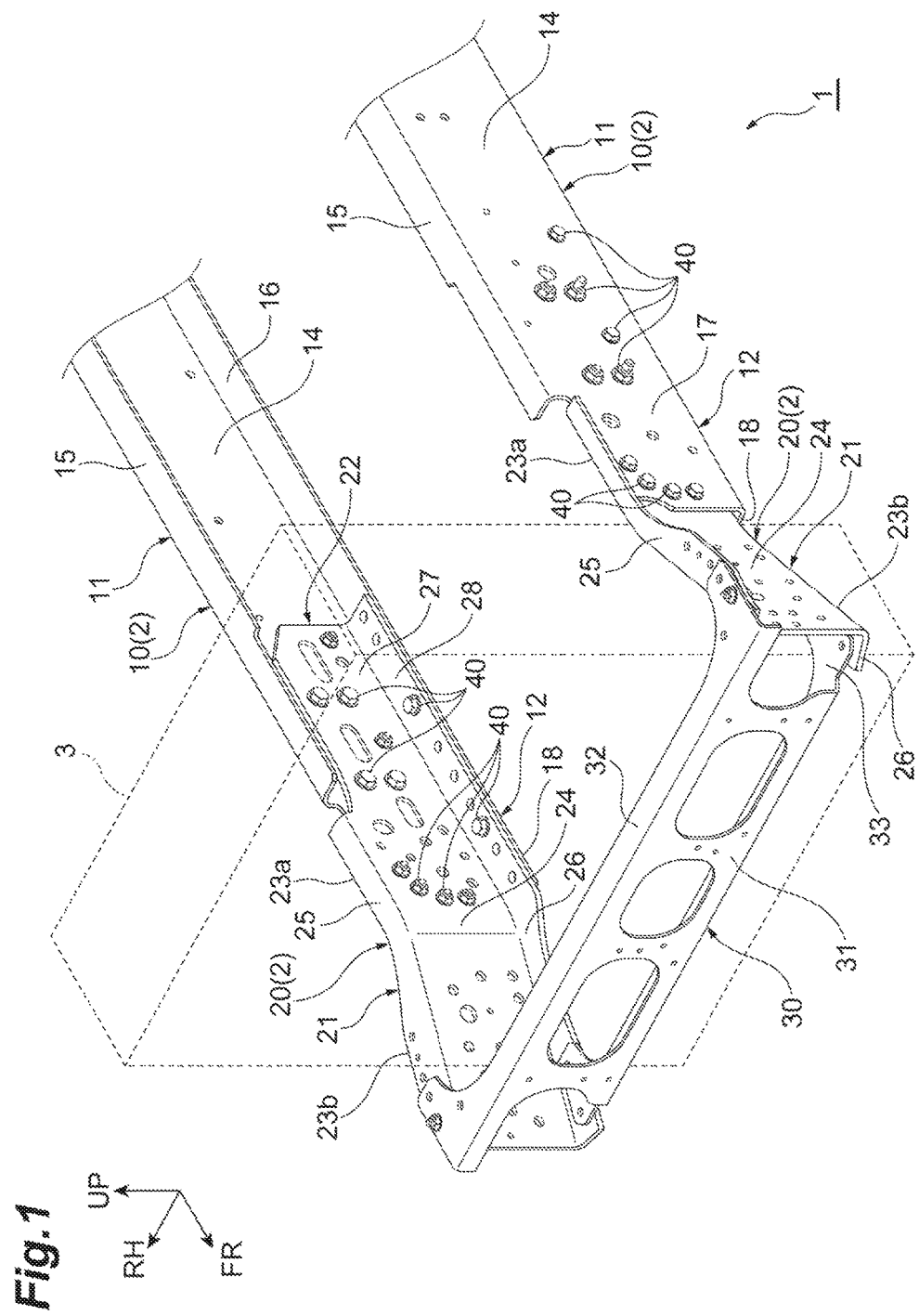
FIG. 1 is a perspective view of a vehicle frame structure according to an embodiment.
Figure 2:
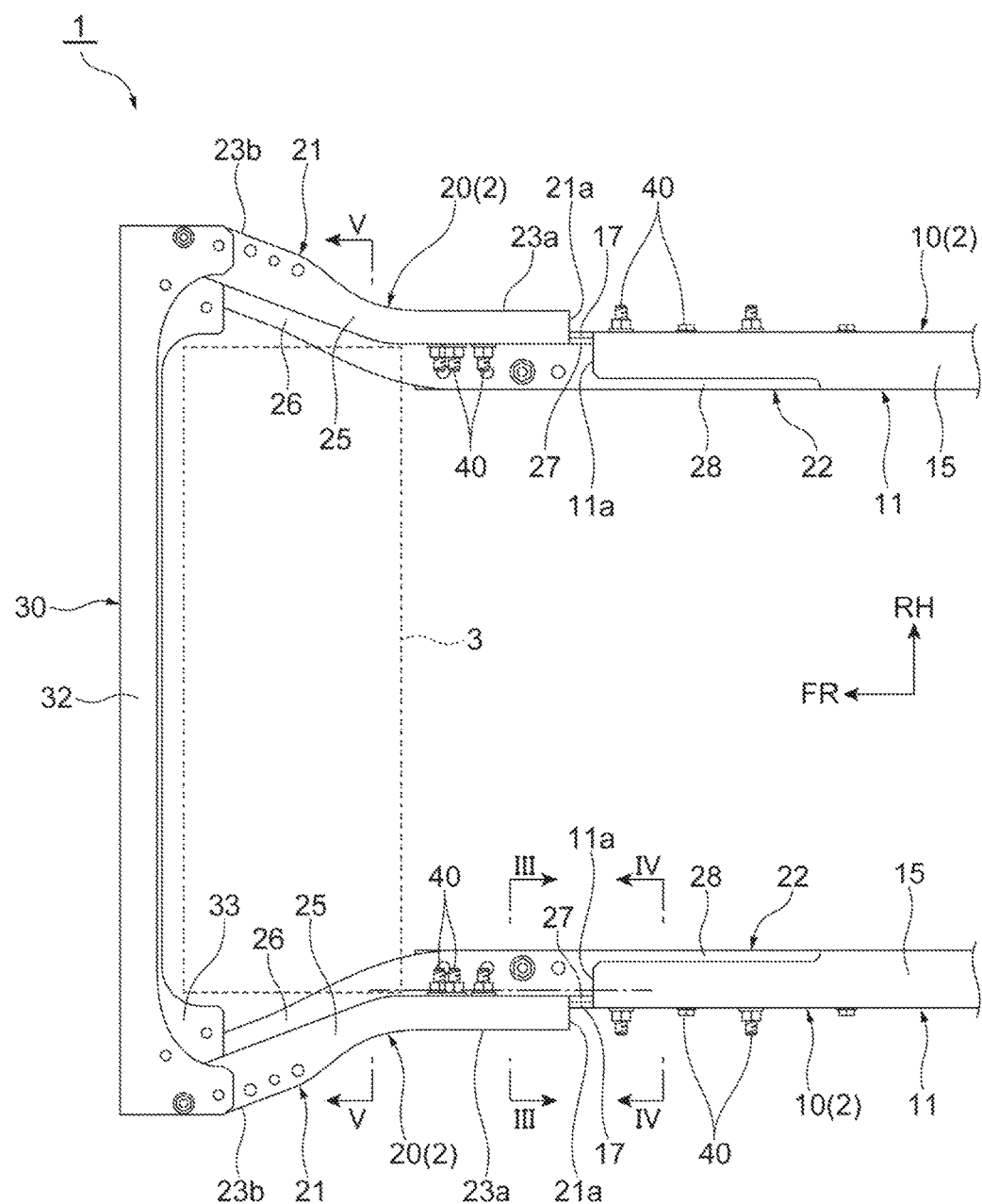
FIG. 2 is a top view of the vehicle frame structure of FIG. 1.

As illustrated in FIGS. 1 and 2, a vehicle frame structure 1 according to the embodiment includes a pair of side rails 2 which extends in the vehicle front-rear direction and faces each other. The side rail 2 is divided into a main side rail 10 disposed at the rear side in the vehicle front-rear direction and an extension side rail 20 disposed at the front side in the vehicle front-rear direction. For example, vehicle components such as an engine and a radiator are disposed in a space between the pair of side rails 2. In FIGS. 1 and 2, a radiator arrangement position 3 is indicated by the dashed line.

The main side rail 10 includes a main side rail body 11 and a main side rail overlapping portion 12 which extends from the main side rail body 11 toward the front side in the vehicle front-rear direction. The main side rail body 11 extends in a linear shape in the vehicle front-rear direction from a vehicle rear end portion to a position below a cab (not illustrated). The main side rail body 11 is formed to have a substantially C-shaped (U-shaped) cross-section as in groove steel and has the substantially same cross-sectional shape in the longitudinal direction. Additionally, a shape having such a C-shaped cross-section is also referred to as a channel shape.

Specifically, the main side rail body 11 includes a rectangular plate-shaped main side rail side plate portion 14 which extends in the vehicle up-down direction, a rectangular plate-shaped main side rail upper plate portion 15 which extends inward in the vehicle width direction from an upper edge of the main side rail side plate portion 14, and a rectangular plate-shaped main side rail lower plate portion 16 which extends inward in the vehicle width direction from a lower edge of the main side rail side plate portion 14.

The main side rail overlapping portion 12 extends in a linear shape in the vehicle front-rear direction. The main side rail overlapping portion 12 is formed to have a substantially L-shaped cross-section and has the substantially same cross-sectional shape in the longitudinal direction. Specifically, the main side rail overlapping portion 12 includes a rectangular plate-shaped main side rail overlapping side plate portion 17 which extends in the vehicle up-down direction and a rectangular plate-shaped main side rail overlapping lower plate portion 18 which extends inward in the vehicle width direction from a lower edge of the main side rail overlapping side plate portion 17.

The main side rail overlapping side plate portion 17 extends from the main side rail side plate portion. 14 so as to be coplanar with the main side rail side plate portion 14. The main side rail overlapping lower plate portion 18 extends from the main side rail lower plate portion 16 so as to be coplanar with the main side rail lower plate portion 16. A length of the main side rail overlapping side plate portion 17 in the vehicle up-down direction is smaller than that of the main side rail side plate portion 14. A length of the main side rail overlapping lower plate portion 18 in the vehicle width direction is substantially the same as that of the main side rail lower plate portion 16. Additionally, the main side rail 10 (the main side rail body 11 and the main side rail overlapping portion 12) can be manufactured by, for example, bending such as roll forming.

The extension side rail 20 includes an extension side rail body 21 and an extension side rail overlapping portion 22 which extends from the extension side rail body 21 toward the rear side in the vehicle front-rear direction. The extension side rail body 21 is formed to have a substantially Z-shaped cross-section and extends in the vehicle front-rear direction.

Specifically, the extension side rail body 21 includes a rectangular plate-shaped extension side rail side plate portion 24 which extends in the vehicle up-down direction, a rectangular plate-shaped extension side rail upper plate portion 25 which extends outward in the vehicle width direction from an upper edge of the extension side rail side plate portion 24, and a rectangular plate-shaped extension side rail lower plate portion 26 which extends inward in the vehicle width direction from a lower edge of the extension side rail side plate portion 24.

The extension side rail side plate portion 24 is bent in the vehicle width direction at the intermediate portion in the vehicle front-rear direction. More specifically, the extension side rail body 21 includes a rear portion 23a which extends in a linear shape in the vehicle front-rear direction and a front portion 23b which extends outward in the vehicle width direction as it goes from the rear portion 23a forward in the vehicle front-rear direction.

The extension side rail overlapping portion 22 extends in a linear shape in the vehicle front-rear direction to have a substantially L-shaped cross-section and has the substantially same cross-sectional shape in the longitudinal direction. Specifically, the extension side rail overlapping portion 22 includes a rectangular plate-shaped extension side rail overlapping side plate portion 27 which extends in the vehicle up-down direction and a rectangular plate-shaped extension side rail overlapping lower plate portion 28 which extends inward in the vehicle width direction from a lower edge of the extension side rail overlapping side plate portion 27.

The extension side rail overlapping side plate portion 27 extends from the extension side rail side plate portion 24 so as to be coplanar with the extension side rail side plate portion 24. The extension side rail, overlapping lower plate portion 28 extends from the extension side rail lower plate portion 26 so as to be coplanar with the extension side rail lower plate portion 26. Additionally, the extension side rail 20 (the extension side rail body 21 and the extension side rail overlapping portion 22) can be manufactured by, for example, simple bending such as press working.

A front portion of the main side rail 10 and a rear portion of the extension side rail 20 are connected to each other in an overlapping state. Specifically, the main side rail overlapping side plate portion 17 of the main side rail overlapping portion 12 is disposed along (follows) an outer surface of the extension side rail side plate portion 24 in the vehicle width direction and is rigidly connected (fastened) to the extension side rail side plate portion 24 by a fastening part 40. As an example of the fastening part 40, a set of a bolt and a nut can be exemplified. The main side rail overlapping lower plate portion 18 of the main side rail overlapping portion 12 is disposed along (follows) a lower surface (an outer surface) of the extension side rail lower plate portion 26 in the vehicle up-down direction and is rigidly connected (fastened) to the extension side rail lower plate portion 26 by the fastening part 40.

Further, the extension side rail overlapping side plate portion 27 of the extension side rail overlapping portion 22 is disposed along (follows) an inner surface of the main side rail side plate portion 14 in the vehicle width direction and is rigidly connected (fastened) to the main side rail side plate portion 14 by the fastening part 40. The extension side rail overlapping lower plate portion 28 of the extension side rail overlapping portion 22 is disposed along (follows) an upper surface (an inner surface) of the main side rail lower plate portion 16 in the vehicle up-down direction and is rigidly connected (fastened) to the main side rail lower plate portion 16 by the fastening part 40.

The vehicle frame structure 1 further include a cross member 30 connecting the pair of extension side rails 20 to each other. The cross member 30 extends in a linear shape in the vehicle width direction and both ends thereof are connected to the front portions of the pair of extension side rail bodies 21. The cross member 30 is formed to have a substantially C-shaped (U-shaped) cross-section.

Specifically, the cross member 30 includes a cross member side plate portion 31 which extends in the vehicle up-down direction, a cross member upper plate portion 32 which extends backward in the vehicle front-rear direction from an upper edge of the cross member side plate portion 31, and a cross member lower plate portion 33 which extends backward in the vehicle front-rear direction from a lower edge of the cross member side plate portion 31. The cross member side plate portion 31 is provided with a plurality of lightening holes.

Additionally, the cross member 30 can be manufactured by, for example, simple bending such as roll forming.

At both ends in the vehicle width direction, the cross member upper plate portion 32 is disposed along an upper surface (an outer surface) of the extension side rail upper plate portion 25 and is rigidly connected (fastened) to the extension side rail upper plate portion 25 by bolt fastening. At both ends in the vehicle width direction, the cross member lower plate portion 33 is disposed along an upper surface (an inner surface) of the extension side rail lower plate portion 26 and is rigidly connected (fastened) to the extension side rail lower plate portion 26 by bolt fastening.

Vehicle components such as an engine and a radiator are disposed between the main side rail 10 and the extension side rail 20 which are connected to each other in the aforementioned way. For example, in the pair of extension side rail bodies 21, the radiator arrangement position 3 is set between the facing front portions 23b and an engine arrangement position is set at the rear portion (the rear side) of the facing rear portions 23a.

In the vehicle frame structure 1, as illustrated in FIGS. 3 and 4, a part of a front end surface 11a of the main side rail body 11 and a part of a rear end surface 21a of the extension side rail body 21 face each other in the vehicle front-rear direction. Specifically, in this example, a part of a front end surface 14a of the main side rail side plate portion 14 and a part of a rear end surface 25a of the extension side rail upper plate portion 25 face each other. In other words, a part of the main side rail body 11 (the main side rail side plate portion 14) and a part of the extension side rail body 21 (the extension side rail upper plate portion 25) overlap each other when viewed from the vehicle front-rear direction. In the other words, the main side rail side plate portion 14 and the extension side rail upper plate portion 25 intersect each other when viewed from the vehicle front-rear direction. As illustrated in FIGS. 1 and 2, in this example, a part of the front end surface 11a of the main side rail body 11 and a part of the rear end surface 21a of the extension side rail body 21 are away from each other.

As described above, in the vehicle frame structure 1, a part of the front end surface 11a of the main side rail body 11 and a part of the rear end surface 21a of the extension side rail body 21 face each other in the vehicle front-rear direction. For this reason, for example, when a vehicle collides with obstacles or the like from a front side so that a backward impact force in the vehicle front-rear direction acts on the extension side rail 20, the extension side rail 20 is deformed and/or moved backward in the vehicle front-rear direction and the rear end surface 21a of the extension side rail body 21 bumps into the front end surface 11a of the main side rail body 11. Accordingly, an impact force is directly transmitted from the extension side rail 20 to the main side rail 10. Thus, since the impact force is also received by the main side rail body 11, a load (a divided load) applied to the fastening part 40 connecting the main side rail 10 and the extension side rail 20 to each other is reduced. As a result, since it is possible to suppress the breakage of the fastening part 40 with a simple structure, it is possible to suppress that the extension side rail 20 falls off.

Further, in the vehicle frame structure 1, since collision energy is transmitted to the main side rail 10, it is possible to suppress the deformation of the extension side rail 20 and to ensure a driver's survival space. Furthermore, since the load applied to the fastening part 40 is reduced, it is possible to suppress an increase in the number of the fastening parts 40 or an increase in strength thereof. Thus, it is possible to ensure collision safety while suppressing an increase in cost.

In the vehicle frame structure 1, since the rear end surface 21a of the extension side rail body 21 bumps into the front end surface 11a of the main side rail body 11 even when the fastening part 40 is broken so that the connection between the extension side rail 20 and the main side rail 10 is released, it is possible to control the backward pressing of the extension side rail 20 in the vehicle front-rear direction. Even with this configuration, it is possible to suppress that the extension side rail 20 falls off.

In the vehicle frame structure 1, since the extension side rail upper plate portion 25 extends outward in the vehicle width direction from the upper edge of the extension side rail side plate portion 24, it is possible to avoid the interference of the extension side rail upper plate portion 25 when the vehicle components are disposed at the inside in the vehicle width direction in relation to the extension side rail side plate portion 24.

This point will be described in detail with reference to FIG. 5. FIG. 5 is a schematic cross-sectional view taken along a line V-V of FIG. 2. In FIG. 5, the extension side rail upper plate portion 25 which extends inward in the vehicle width direction is indicated by a virtual line L. Regarding the radiator, an outer shape of a radiator body 4 disposed at the front side in the vehicle front-rear direction is indicated by a dashed line and an outer shape of a cooling fan 5 disposed at the rear side in the vehicle front-rear direction is indicated by a solid line. As illustrated in FIG. 5, if the extension side rail upper plate portion 25 extends inward in the vehicle width direction, the extension side rail upper plate portion 25 contacts the cooling fan 5. Meanwhile, in the vehicle frame structure 1, since the extension side rail upper plate portion 25 extends outward in the vehicle width direction, it is possible to prevent the extension side rail upper plate portion 25 from contacting the radiator R.

As illustrated in FIG. 5, if the whole extension side rail body 21 extends in a linear shape in the vehicle front-rear direction, the extension side rail lower plate portion 26 at the front portion 23b contacts the radiator body 4. Meanwhile, in the vehicle frame structure 1, since the front portion 23b of the extension side rail body 21 extends outward in the vehicle width direction as it goes forward in the vehicle front-rear direction, it is possible to prevent the extension side rail lower plate portion 26 from contacting the radiator body 4.

In this way, in the vehicle frame structure 1, since the extension side rail 20 disposed at the front side in the vehicle front-rear direction is formed to have a substantially Z-shaped cross-section, it is possible to ensure a space for arranging the vehicle components at the inside of the vehicle width direction. Further, since the main side rail 10 disposed at the rear side in the vehicle front-rear direction is formed to have a substantially C-shaped cross-section, it is possible to ensure the rigidity of the whole side rail 2.

In the vehicle frame structure 1, since the extension side rail side plate portion 24 is disposed at the inside in the vehicle width direction in relation to the main side rail overlapping side plate portion 17 of the main side rail overlapping portion 12, the extension side rail 20 is deformed and/or moved so as to enter inward in the vehicle width direction when the backward impact force in the vehicle front-rear direction is applied to the extension side rail 20. At this time, since it is possible to control the deformation and/or the movement of the extension side rail 20 by the vehicle components mounted at the inside in the vehicle width direction in relation to the extension side rail 20, it is possible to further suppress that the extension side rail 20 falls off.

In the vehicle frame structure 1, since the extension side rail overlapping side plate portion 27 of the extension side rail overlapping portion 22 is also located at the inside in the vehicle width direction in relation to the main side rail side plate portion 14, the extension side rail 20 is deformed and/or moved to enter inward in the vehicle width direction when the backward impact force in the vehicle front-rear direction is applied to the extension side rail 20. At this time, since it is possible to control the deformation and/or the movement of the extension side rail 20 by the vehicle components mounted at the inside in the vehicle width direction in relation to the extension side rail 20, it is possible to further suppress that the extension side rail 20 falls off.

In the vehicle frame structure 1, the side rail 2 is divided into the main side rail 10 which has the substantially same cross-sectional shape in the vehicle front-rear direction and the extension side rail 20 which is bent in the vehicle width direction at the intermediate portion in the vehicle front-rear direction. Accordingly, it is possible to manufacture the main side rail 10 by simple bending such as roll forming and to manufacture the extension side rail 20 by simple bending such as press working. As a result, it is possible to easily manufacture the frame structure 1 while suppressing an increase in cost involving with equipment such as a mold compared to, for example, a case where the side rail 2 is not divided and the whole side rail 2 is formed by press working.

Although the preferred embodiment of the invention has been described above, the invention is not limited to the above-described embodiment and may be modified within the scope not changing the gist described in each claim or may be applied to other applications.

For example, in the above-described embodiment, a part of the front end surface 14a of the main side rail side plate portion 14 and a part of the rear end surface 25a of the extension side rail upper plate portion 25 face each other. However, a part of the front end surface 11a of the main side rail body 11 and a part of the rear end surface 21a of the extension side rail body 21 may face each other. For example, a part of the front end surface of the main side rail upper plate portion 15 and a part of the rear end surface of the extension side rail side plate portion 24 may face each other.

In the above-described embodiment, a part of the front end surface 11a of the main side rail body 11 and a part of the rear end surface 21a of the extension side rail body 21 are away from each other, but may contact each other. Even in this case, when a backward impact force in the vehicle front-rear direction is applied to the extension side rail 20, the impact force is directly transmitted from the extension side rail 20 to the main side rail 10.

The extension side rail body 21 may be formed to have a substantially Z-shaped cross-section. For example, the extension side rail upper plate portion 25 may extend inward in the vehicle width direction from the upper edge of the extension side rail side plate portion 24 and the extension side rail lower plate portion 26 may extend outward in the vehicle width direction from the lower edge of the extension side rail side plate portion 24.

The extension side rail overlapping portion 22 may include only the extension side rail overlapping side plate portion 27. The extension side rail overlapping portion 22 may not be connected to the main side rail side plate portion 14. Similarly, the main side rail overlapping portion 12 may include only the main side rail overlapping side plate portion 17. The main side rail overlapping portion 12 may not be connected to the extension side rail side plate portion 24. Any one of the extension side rail overlapping portion 22 and the main side rail overlapping portion 12 may be provided. Both the extension side rail overlapping portion 22 and the main side rail overlapping portion 12 may not be provided.

REFERENCE SIGNS LIST

1: vehicle frame structure, 2: side rail, 10: main side rail, 11: main side rail body, 11a: front end surface, 12: main side rail overlapping portion, 14: main side rail side plate portion, 15: main side rail upper plate portion, 16: main side rail lower plate portion, 20: extension side rail, 21: extension side rail body, 21a: rear end surface, 22: extension side rail overlapping portion, 24: extension side rail side plate portion, 25: extension side rail upper plate portion, 26: extension side rail lower plate portion.

The invention claimed is:

1. A vehicle frame structure comprising:
   a pair of main side rails extending in a vehicle front-rear direction and facing each other; and
   an extension side rail connected to a front portion of the main side rail in the vehicle front-rear direction and extending in the vehicle front-rear direction,
   wherein the main side rail includes a main side rail body having a substantially C-shaped cross-section,
   the extension side rail includes an extension side rail body having a substantially Z-shaped cross-section, and
   a part of a front end surface of the main side rail body and a part of a rear end surface of the extension side rail body face each other in the vehicle front-rear direction.

2. The vehicle frame structure according to claim 1,
   wherein the main side rail body includes
   a main side rail side plate portion extending in a vehicle up-down direction,
   a main side rail upper plate portion extending inward in a vehicle width direction from an upper edge of the main side rail side plate portion, and a main side rail lower plate portion extending inward in the vehicle width direction from a lower edge of the main side rail side plate portion, and the extension side rail body includes an extension side rail side plate portion extending in the vehicle up-down direction, an extension side rail upper plate portion extending outward in the vehicle width direction from an upper edge of the extension side rail side plate portion, and an extension side rail lower plate portion extending inward in the vehicle width direction from a lower edge of the extension side rail side plate portion.

3. The vehicle frame structure according to claim 2, wherein the extension side rail further includes an extension side rail overlapping portion extending backward in the vehicle front-rear direction from the extension side rail side plate portion, and the main side rail and the extension side rail overlap each other so that the extension side rail overlapping portion follows an inner surface of the main side rail side plate portion in the vehicle width direction.

4. The vehicle frame structure according to claim 2, wherein the main side rail includes a main side rail overlapping portion extending forward in the vehicle front-rear direction from the main side rail side plate portion, and the main side rail and the extension side rail overlap each other so that the main side rail overlapping portion follows an outer surface of the extension side rail side plate portion in the vehicle width direction.

\* \* \* \* \*